Sept. 8, 1931.  B. F. GRAVELY  1,822,211
HILLSIDE AGRICULTURAL MACHINE
Filed July 24, 1930  2 Sheets-Sheet 1

B. F. Gravely, Inventor

By Isaace C. Chandler
Attorney

Sept. 8, 1931.   B. F. GRAVELY   1,822,211
HILLSIDE AGRICULTURAL MACHINE
Filed July 24, 1930   2 Sheets-Sheet 2

B. F. Gravely, Inventor

By Horace C. Chandler
Attorney

Patented Sept. 8, 1931

1,822,211

UNITED STATES PATENT OFFICE

BENJAMIN F. GRAVELY, OF DUNBAR, WEST VIRGINIA

HILLSIDE AGRICULTURAL MACHINE

Application filed July 24, 1930. Serial No. 470,472.

This invention relates to new and useful improvements in agricultural machines.

One object of the invention is to provide a machine of this character which is adapted to be readily adjusted to conform with the slope of the hillside on which the machine is being operated.

Another object resides in the provision of a steering mechanism which is adapted to serve to accomplish the lateral tilting adjustment of the frame of the machine, whereby to conform with the hillside slope.

Other objects and advantages will be apparent from the following description when taken in connection with the accompanying drawings.

Figure 1:
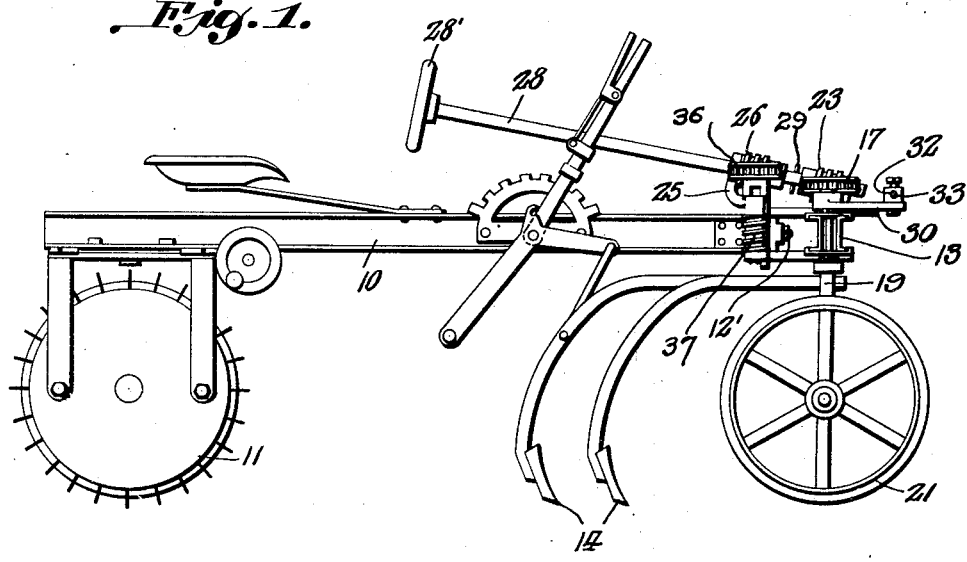
Figure 1 is a side elevation of an agricultural machine made in accordance with the present invention.
Figure 2:
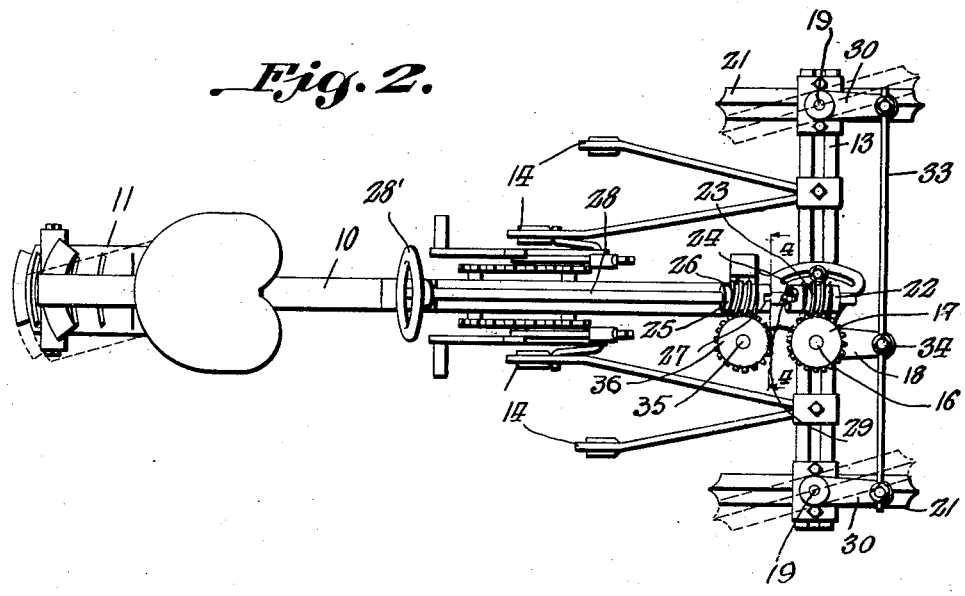
Figure 2 is a top plan view of the same.
Figure 3:
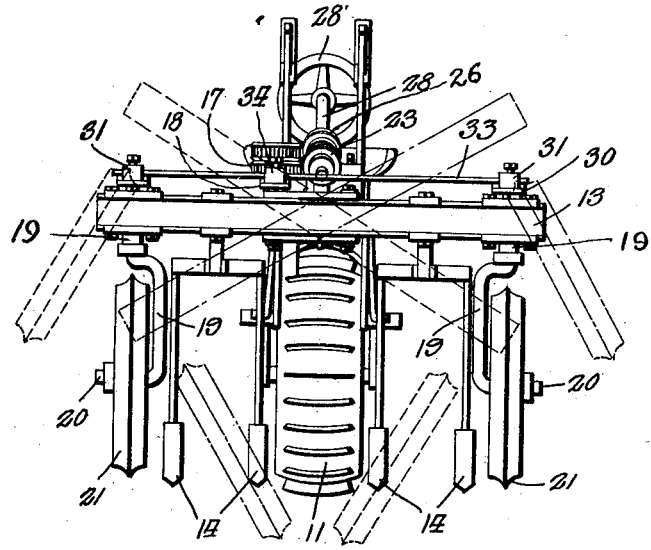
Figure 3 is a front elevation of the machine, showing the same laterally adjusted to conform with a slope of a hillside.
Figure 4:
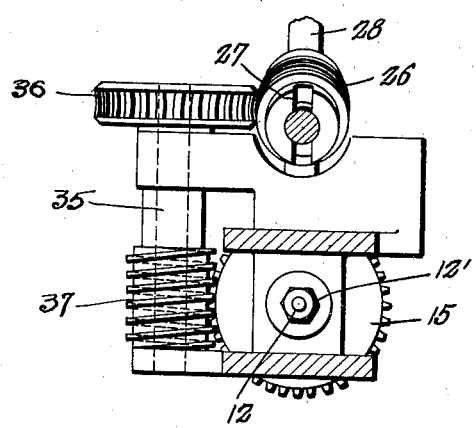
Figure 4 is an enlarged vertical transverse sectional view on the line 4—4 of Figure 2.

Referring particularly to the accompanying drawings, 10 represents a frame, the rear end of which is supported by a driving unit 11, which forms the subject-matter of a separate application filed by me. Mounted on the front of the frame 10, by means of the horizontal pivot 12, so that it may be rocked transversely of the machine, is a beam 13, which has connected therewith the rearwardly trailing ground treating elements 14. Carried by the pivot 12 is a vertical worm-wheel 15, to which reference will be made later herein. Carried by the beam 13 is a vertical pivot 16, and mounted on the upper end of said pivot is a worm wheel 17, arranged in horizontal position, and having the forwardly extending arm 18. Disposed vertically in each end of the beam 13 is a shaft 19, the lower end of which is turned outwardly, at right angles, as at 20, and has a ground engaging wheel 21 mounted thereon, whereby to properly support the front end of the frame 10. Mounted on the center of the upper face of the beam 13, in suitable brackets 22, is a worm 23, which meshes with the worm-wheel 17, and thereby functions as the steering worm, the inner or rear end of said worm being provided with the notches 24. Mounted in suitable bearings 25, on the frame 10, rearwardly of the beam 13, is the upwardly and rearwardly inclined worm 26, in the lower end of which are formed the notches 27, similar to those of the worm 23. The notched ends of the worms 23 and 26 are spaced apart as shown, and said worms are longitudinally bored to receive slidably therethrough the lower end of the steering column 28, which is properly supported on the frame 10, and has on its upper end the hand-wheel 28'. Extending transversely through that portion of the steering column which lies between the notched ends of the worms, is a pin 29, which is adapted to engage alternately in the notches of said worms, when the column is shifted upwardly or downwardly, whereby said column is capable of rotating either of said worms, to steer the wheels 21, or accomplish the transverse adjustment of the beam 13, to conform with the slope of the hillside on which the machine is being used.

The pivot bolt 12 is provided with a clamping nut 12', by means of which the beam may be firmly held in its different angularly adjusted positions.

On the upper end of each of the shafts 19 is a forwardly extending arm 30, and rotatable on the forward end of each arm is a vertical member 31, having a transverse opening 32, receiving one end of a transverse tie rod 33, the intermediate portion of which is secured within a member 34, similar to the members 31, and mounted on the forward end of the arm 18, whereby the worm-wheel 17, when rotated, will move the tie rod, to steer the wheels 21.

Properly mounted on the frame 10, rearwardly of the vertical shaft 16, is a similar shaft 35, on the upper end of which is mounted a worm-wheel 36, which meshes with the before-mentioned worm 26, and which functions as the adjusting worm. On the lower end of this shaft 35 is a worm 37, which meshes with the worm-wheel 15. Thus, when the steering column is shifted upwardly, until the pin 29 engages in the notches 27, of the worm 26, the operator can, by rotating the said column, after having first loosened the nut 12', cause the transverse adjustment of the beam 13, to conform with the slope of the hillside.

What is claimed is:

1. In a device of the class described, a frame, a member mounted on the frame for transverse rocking adjustment, dirigible wheels supporting said member, and a steering means shiftable into one position to steer said wheels, and shiftable into another position to rock said member.

2. In a device of the character described, a frame, a transverse member mounted on the frame for pivotal movement in a vertical plane, dirigible wheels supporting said member, and a steering means including a steering column shiftable into one position to steer said wheels and into another position to rock said member.

3. In a device of the class described, a frame, a transverse beam mounted on one end of the frame for pivotal movement in a vertical plane, dirigible wheels supporting the beam, a steering means including a gear operatively connected with the wheels, a gear operatively connected with said pivot of the beam, and a steering column shiftable into alternate engagement with said gears whereby to steer the wheels, at times, and to accomplish the rocking of said beam, at times.

4. In a device of the character described, a frame, a transverse beam pivotally mounted on the frame for adjustment in a vertical plane, an adjusting worm on the frame, a worm wheel on the pivot of said beam in operative relation to said adjusting worm, a steering worm on the beam, dirigible wheels supporting said beam and including a worm wheel in operative relation to the steering worm, and a steering column shiftable into and out of engagement, alternately, with the adjusting and steering worms whereby to adjust said beam, at times, and to steer said wheels, at times.

5. In a device of the character described, a frame, a transverse beam pivotally mounted on said frame for adjustment in a vertical plane, an adjusting worm on the frame having notches in one end, a worm wheel on the pivot of said beam in operative relation to said adjusting worm, a steering worm on said beam having notches in one end, a worm wheel on said beam in operative relation to said steering worm, dirigible wheels supporting said beam and in operative relation to said steering worm, and a steering column slidable through said worms having a pin for alternate engagement with the notches of said worms, whereby to adjust said beam, at times, and to steer said wheels, at times.

In testimony whereof, I affix my signature.

BENJAMIN F. GRAVELY.